(12) United States Patent
Mikkelsen

(10) Patent No.: US 11,293,559 B2
(45) Date of Patent: Apr. 5, 2022

(54) VALVE SYSTEM, PIPING MANIFOLD AND PUMP SYSTEM

(71) Applicant: GRUNDFOS HOLDING A/S, Bjerringbro (DK)

(72) Inventor: Steen Mikkelsen, Bjerringbro (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 0 days.

(21) Appl. No.: 17/017,935

(22) Filed: Sep. 11, 2020

(65) Prior Publication Data

US 2021/0080018 A1  Mar. 18, 2021

(30) Foreign Application Priority Data

Sep. 12, 2019  (EP) .................................... 19196967

(51) Int. Cl.
*F16K 15/02* (2006.01)
*F16K 15/18* (2006.01)
*F04B 53/10* (2006.01)
*F16K 27/02* (2006.01)

(52) U.S. Cl.
CPC .............. *F16K 15/18* (2013.01); *F04B 53/10* (2013.01); *F16K 15/021* (2013.01); *F16K 27/0209* (2013.01)

(58) Field of Classification Search
CPC .... F16K 15/18; F16K 15/021; F16K 27/0209; F04B 53/10
See application file for complete search history.

(56) References Cited

U.S. PATENT DOCUMENTS

| 2,213,487 | A | * | 9/1940 | Davis | ...................... F16K 15/18 137/533.13 |
| 3,982,561 | A | * | 9/1976 | Harthun | .................. F16K 15/18 137/596.2 |
| 4,475,494 | A | | 10/1984 | Huther | |
| 2018/0112377 | A1 | | 4/2018 | Huang et al. | |
| 2018/0216320 | A1 | | 8/2018 | Smith et al. | |
| 2021/0215264 | A1 | * | 7/2021 | Fletcher | .............. F16K 27/0209 |

FOREIGN PATENT DOCUMENTS

EP  3 467 360 A1  4/2019

* cited by examiner

*Primary Examiner* — P. Macade Nichols
(74) *Attorney, Agent, or Firm* — McGlew and Tuttle, P.C.

(57) ABSTRACT

A valve system (13), connectable to a pump system (1), includes a pump assembly (3) connectable to a pipe (5), wherein the valve system (13) includes a valve (15) including a pipe section (39), of the pipe (5), that defines a primary flow direction (19), and a valve opening (41) in the pipe section, a valve seat (43) and a valve body (45). The valve opening (41), the valve seat (43) and the valve body (45) define a common valve axis (47) extending transversely to the primary flow direction. An operating element (49), arranged at the pipe section opposite the valve opening, is configured to control the valve body for operating in a check-valve mode to open the valve opening upon a fluid flow from the valve opening towards the valve body and for operating in a shut off-valve to close the valve opening for any fluid flow direction.

16 Claims, 8 Drawing Sheets

VALVE SYSTEM, PIPING MANIFOLD AND PUMP SYSTEM

CROSS REFERENCE TO RELATED APPLICATIONS

This application claims the benefit of priority under 35 U.S.C. § 119 of European Application 19 196 967.4, filed Sep. 12, 2019, the entire contents of which are incorporated herein by reference.

TECHNICAL FIELD

The present disclosure is directed to a valve system, and both a piping manifold and a pump system equipped with such a valve system. The valve system is particularly useful for high flow circulation pump systems comprising a plurality of multi-stage circulation pumps arranged in parallel to each other, e.g. in form of booster systems.

TECHNICAL BACKGROUND

The demand for a certain minimum water pressure at multi-story buildings like hotels, offices or other large buildings at all times of the day may require one or more pressure-boosting systems to raise incoming municipal water pressure to sufficiently serve upper floors. Booster systems typically contain one or more powerful multi-stage circulation pumps and related accessories and controls.

Until the early 1990s, pressure regulator valves were typically used to control booster system pressure. Many times, these pump systems operated all pumps at maximum speed and "bled off" excess pressure to reach the desired output. This was quite inefficient in terms of energy consumption. The more energy-efficient option is to design a booster system that ramps up the optimal number of pumps to the optimal speed for meeting the specific demand.

Modern booster systems therefore integrate multiple multi-stage pumps with variable frequency drive-controlled motors, along with software that adjusts pump speed and the number of pumps in operation to meet frequently changing system demand. These systems are designed to deliver the minimal pump output necessary to achieve optimal performance. This means that not all pumps of a booster system run at the same time or at the same speed. Some of the pumps may be idle while others are running.

The parallel connection of the pumps of such a booster system to a piping thus requires that currently running pumps do not pump "backwards" through currently idle pumps. This may be achieved by installing a non-return valve, e.g. a check valve, at each pump. Furthermore, for each pump a shut-off valve is required at the inlet side as well as at the outlet side to allow maintenance and/or disassembling of a pump while the other pumps remain operational. The at least three required valves per pump typically use up significant space for installing the booster system. Furthermore, each of the valves adds a certain pipe resistance which reduces the efficiency of the booster system.

SUMMARY

It is thus an object of the present disclosure to provide a valve system for equipping a piping manifold for connecting a pump system that allows installing the booster system with less space consumption. Moreover, it is an object of the present disclosure to provide for a more efficient flow from the pumps into the piping, i.e. providing a valve system inducing less pipe resistance.

A valve system, piping manifold and pump system according to the present disclosure allows for a smaller and more efficient booster system.

According to a first aspect of the present disclosure, a valve system is provided that is fluidly connectable to a pump system comprising at least one pump assembly being fluidly connectable to a pipe. The valve system comprises at least one valve comprising a pipe section of the pipe, wherein the pipe section defines a primary flow direction. The at least one valve further comprises a valve opening in the pipe section, a valve seat and a valve body, wherein the valve opening, the valve seat and the valve body define a common valve axis extending transversely to the primary flow direction. The at least one valve further comprises an operating element arranged at the pipe section diametrically opposite from the valve opening, wherein the operating element is configured to control the valve body for selectively operating in a check-valve mode, in which the valve body is movable along the valve axis to open the valve opening upon a fluid flow from the valve opening towards the valve body, and wherein the operating element is configured to control the valve body for selectively operating in a shut off-valve mode, in which the valve body is fixed against the valve seat to close the valve opening for any fluid flow direction.

The at least one valve thereby combines both the functionality of a check-valve and the functionality of a shut-off valve in order to save space. The pipe section being part of the valve further saves space.

Optionally, the at least one valve may further comprise a pump connection being connectable to the at least one pump assembly, wherein the valve seat is an integral part of the pump connection. This is also beneficial in terms of space consumption and to reduce the diversity of parts.

Optionally, the at least one valve may further comprise a valve control shaft extending along the valve axis and operatively connecting the operating element and the valve body. The valve control shaft may thus transversely cross the pipe section, so that it should preferably be as thin as possible for least flow resistance, but stable enough for operating the valve body.

Optionally, the operating element may be configured to determine the position of the valve control shaft along the valve axis. Strictly speaking, only in the shut off-valve mode the operating element unambiguously determines the position of the valve control shaft along the valve axis, i.e. the valve body is fixed against the valve seat to close the valve opening for any fluid flow direction. In the check-valve mode, the operating element allows for a defined range of axial movability of the valve body along the valve axis, so that the exact position of the valve control shaft along the valve axis also depends on the flow direction. The range of axial movability is, however, at least the maximum opening position, determined by the operating element. A fluid flow from the valve opening towards the valve body pushes the valve body into the maximum opening position, which is determined by the operating element. A fluid flow from the valve body towards the valve opening pushes the valve body against the valve seat.

Optionally, the valve body may be movably coupled to the valve control shaft to move along the valve axis in a range between an opening position and a closing position in the check-valve mode, wherein the position of the valve control shaft along the valve axis determines the range.

Optionally, the range is zero in an end position of the valve control shaft so that the valve body is fixed in the closing position in the shut off-valve mode.

Optionally, the operating element may comprise an adjustment wheel manually rotatable about the valve axis to determine a range between an opening position and a closing position of the valve body. The adjustment wheel may comprise thread for positioning the valve control shaft along the valve axis.

Optionally, the valve body may have a drop-like shape with a first surface portion having a normal vector with a component facing the valve opening and a second surface portion having a normal vector with a component facing away from the valve opening. Optionally, the first surface portion may be convex and the second surface portion is concave. Optionally, the second surface portion may be longer in direction of the valve axis than the first surface portion. Such a drop-like shape significantly reduces the flow resistance induced by the valve.

Optionally, the pipe section may comprise an insertion opening diametrically opposite from the valve opening, wherein the insertion opening has a larger diameter than the valve body. This is particularly advantageous to allow for a quick and easy assembly of the valve system. Furthermore, if need be, inner parts of the valve can be easily replaced without disassembling the piping manifold as a whole.

Optionally, the operating element may be configured to control the valve body for selectively operating in an always open-valve mode, in which the valve body is fixed in an opening position to open the valve opening for any fluid flow direction. This is particularly advantageous for using the valve system at the inlet side of the booster pump system. At the inlet side, only the shut-off mode is required, so that no movability of the valve body relative to the valve control shaft is needed. For those valves of the valve system at the inlet side, the valve body may therefore be fixed to the valve control shaft along the valve axis. The position of the valve control shaft deter-mined by the operating element therefore unambiguously determines whether the valve is open or closed, independent of the flow direction.

According to a second aspect of the present disclosure, a piping manifold is provided comprising
 a pipe, and
 a valve system as described above with at least two valves,
wherein the pipe section of each valve forms an integral part of the pipe. Preferably, the number of valves corresponds to the number of pumps of the booster pump system which the piping manifold is sup-posed to be used for.

Optionally, the pipe may extend essentially straight along the primary flow direction and the valve axes of the at least two valves are arranged in parallel to each other. This allows for a very compact setup.

Optionally, the at least two valves may be evenly distributed along the pipe with the same distance to each other in the primary flow direction.

According to a third aspect of the present disclosure, a pump system is provided comprising
 at least two pump assemblies,
 a common outlet pipe, wherein the pump assemblies are fluidly connected in parallel to each other to the common outlet pipe, and
 a first valve system as described above with at least one first valve for each pump assembly,
wherein the pipe section of each first valve forms a part of the com-mon outlet pipe.

Optionally, the pump system may further comprise a common inlet pipe and a second valve system, wherein the pump assemblies are fluidly connected in parallel to each other to the common inlet pipe, wherein the second valve system comprises at least one second valve for each pump assembly, wherein the at least one second valve comprises a pipe section, wherein the pipe section of each second valve defines a primary flow direction and forms a part of the common inlet pipe.

Optionally, the at least one second valve may further comprise a valve opening in the pipe section, a valve seat and a valve body, wherein the valve opening, the valve seat and the valve body define a common valve axis extending transversely to the primary flow direction, wherein the at least one second valve further comprises an operating element arranged at the pipe section diametrically opposite from the valve opening, wherein the operating element is configured to control the valve body for selectively operating in an always open-valve mode, in which the valve body is fixed in an opening position to open the valve opening for any fluid flow direction, and wherein the operating element is configured to control the valve body for selectively operating in a shut off-valve mode, in which the valve body is fixed against the valve seat to close the valve opening for any fluid flow direction. Thus, the second valve system at the inlet side therefore differs from the first valve system at the outlet side by not comprising a check-valve mode, but an always open-mode in-stead.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
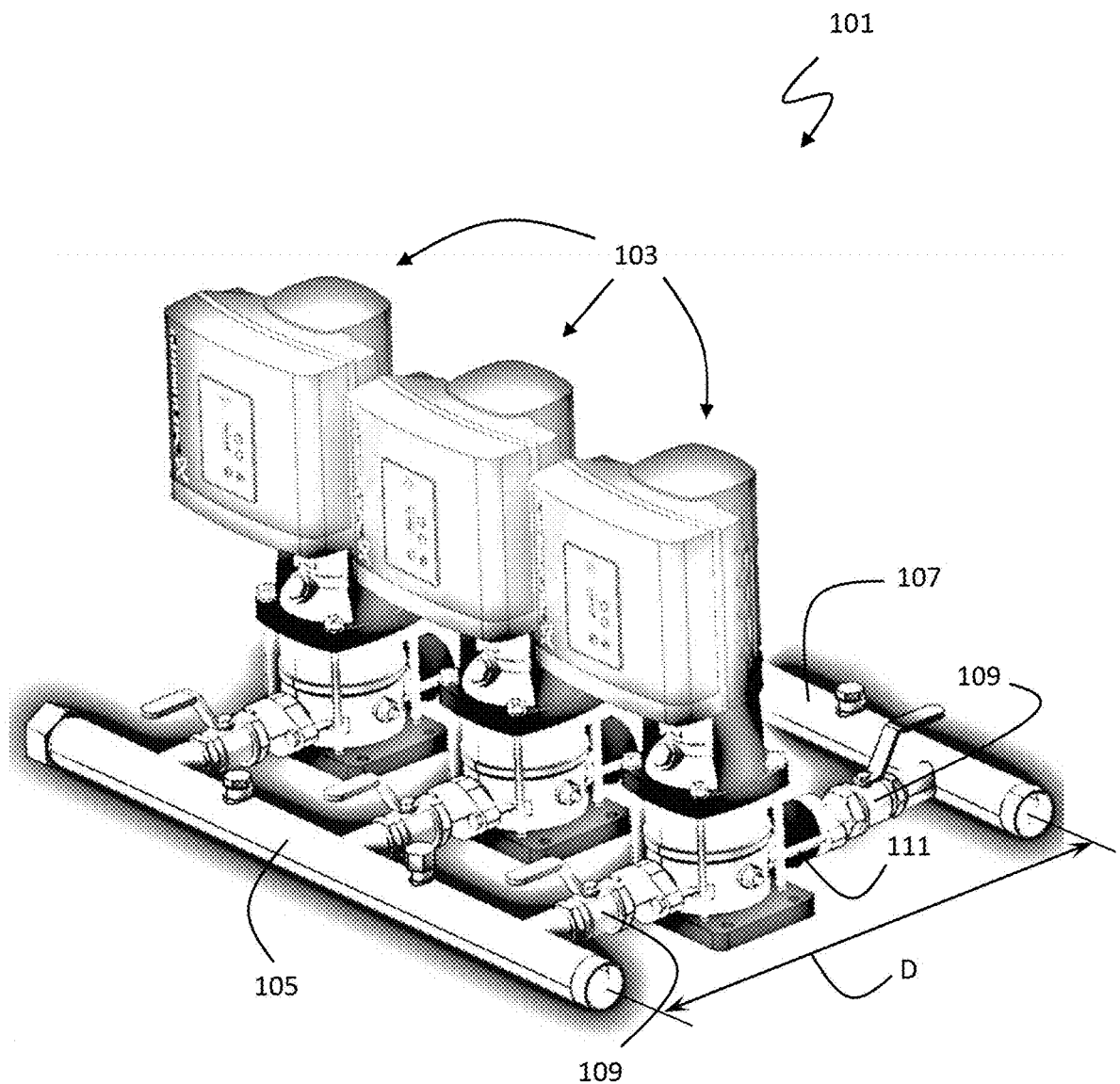
FIG. 1 is a perspective view of a booster pump system as known in the prior art.

Referring to the drawings, FIG. 1 shows a booster pump system 101 as known from the prior art. The booster pump system 101 comprises three pump assemblies 103 being connected in parallel to each other to a pipe system. The pump assemblies 103 are connected with their outlet side to a common outlet pipe 105 as a part of the piping system. Analogously, the pump assemblies 103 are connected with their inlet side to a common inlet pipe 107 as part of the piping system. The outlet pipe 105 and the inlet pipe 107 are arranged in parallel to each other with a distance D to each other to allow accommodating the parallel pump assemblies 3 in a row between the outlet pipe 105 and the inlet pipe 107. The booster pump system 101 further comprises six shut-off valves 109, of which three shut-off valves 109 are arranged between the outlet side of the pump assemblies 103 and the common outlet pipe 105, and of which three shut-off valves 109 are arranged between the inlet side of the pump assemblies 103 and the common in-let pipe 107. Furthermore, the booster pump system 101 comprises three check valves 111 between the inlet side shut-off valves 109 and the inlet side of the pump assemblies 103 in order to prevent a back-flow towards the inlet pipe 107. Therefore, the booster pump system 101 in FIG. 1 must accommodate in sum three valves 109, 111 in line between the outlet pipe 105 and the inlet pipe 107. Thus, the distance D between the outlet pipe 105 and the inlet pipe 107 is relatively large and consumes significant installation space. Furthermore, the flow resistance induced by the three valves 109, 111 per pump assembly 103 is relatively high.

Figure 2:
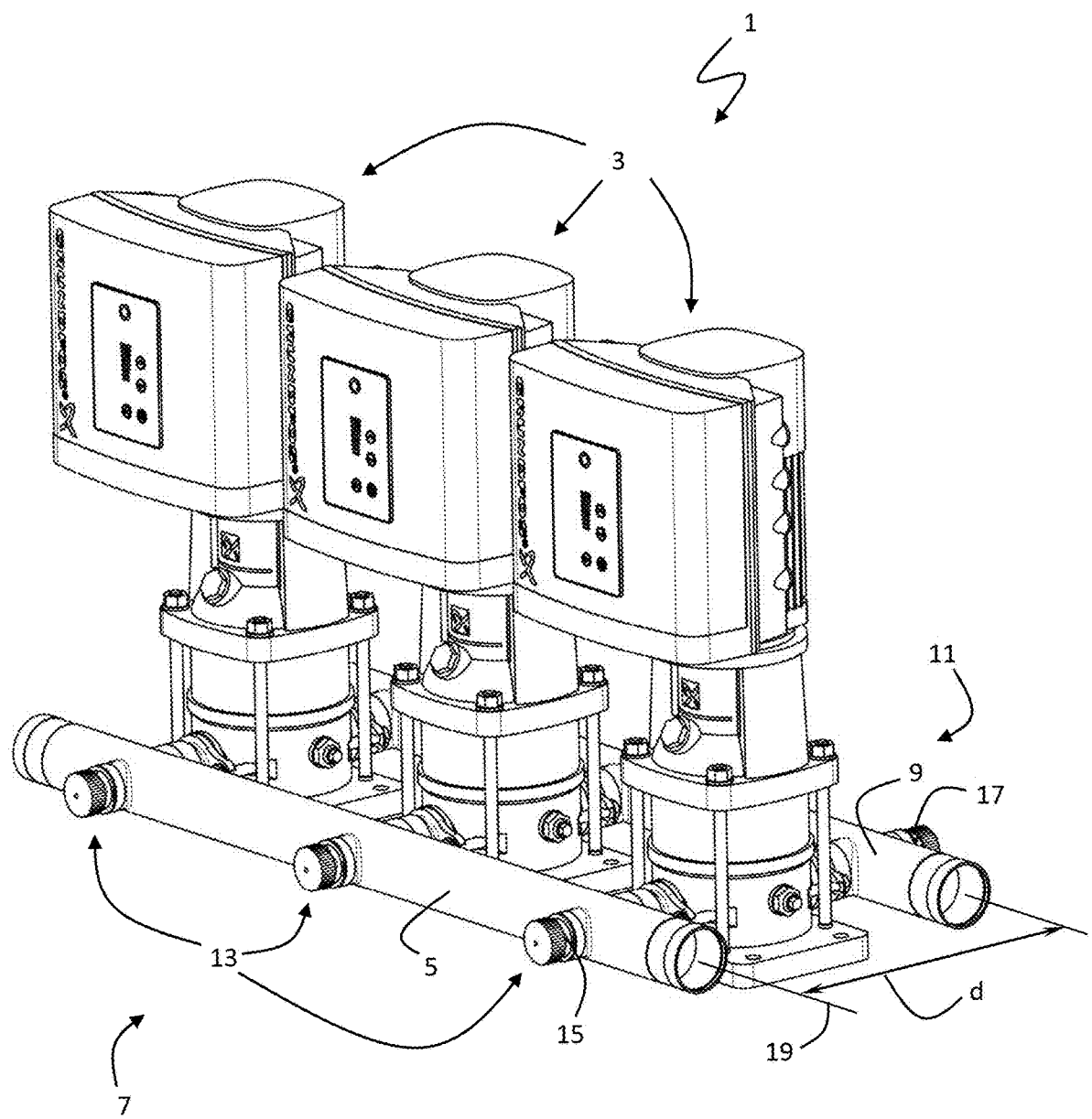
FIG. 2 is a perspective view of a booster pump system according to the present disclosure.

FIG. 2 shows a booster pump system 1 according to the present disclosure. Compared to the known system as depicted in FIG. 1, the booster pump system 1 consumes significantly less installation space and is more efficient, i.e. induces less flow resistance. The booster pump system 1 comprises three pump assemblies 3 arranged in parallel to each other and connected with their outlet side to a common outlet pipe 5 as part of an outlet side pipe manifold 7. At their inlet side, the pump assemblies 3 are connected to a common inlet pipe 9 as part of an inlet side pipe manifold 11. The outlet side pipe manifold 7 comprises a first valve system 13 with three first valves 15. The inlet side pipe manifold 11 comprises a second valve system 14 with three second valves 17 arranged at the inlet side of the pump assemblies 3 analogous to the first valves 15. The outlet pipe 5 and the inlet pipe 9 extend essentially in parallel to each other with a distance d, wherein the distance d is significantly shorter than the distance D in FIG. 1. The outlet pipe 5 and the inlet pipe 9 extend both straight in a primary flow direction 19. The pump assembly 3 comprises a stack of impellers (not shown) rotatable about a vertical rotor axis R. The de-tails of the valves 15, 17 are better visible in FIGS. 3 to 8.

Figure 3:
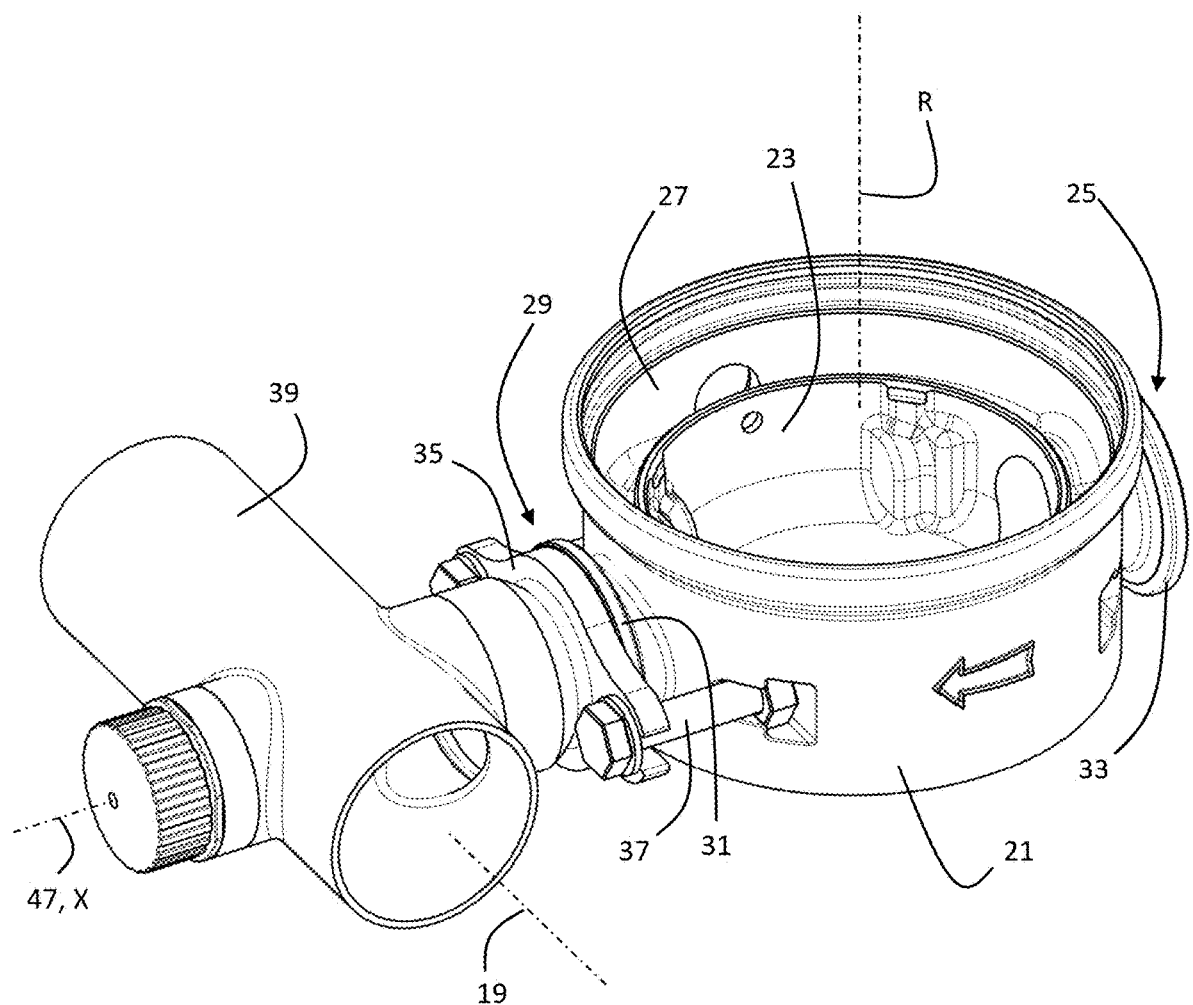
FIG. 3 is a perspective view of a pump housing of a pump assembly with a first valve according to the present disclosure being connected to the outlet side of the pump housing.

FIG. 3 shows a bottom part 21 of a pump housing of one of the pump assemblies 3 connected with its outlet side to one of the first valves 15. The bottom part 21 of the pump housing defines a central low-pressure region 23 in fluid connection with a pump inlet 25 of the pump assembly 3 and an annular high-pressure region 27 arranged radially outward from the low-pressure region 23 and being fluidly connected to a pump outlet 29 of the pump assembly 3. Both the pump inlet 25 and the pump outlet 29 comprise essentially identical flange connections 31, 33 at the inlet side and the outlet side, respectively. The first valve 15 is connected to the outlet flange connection 33 by a pump connection 35 in form of a flange that corresponds to the outlet flange connection 33. The pump connection 35 is fixed to the outlet flange connection 33 by two bolts 37. The pump inlet 25 and the pump outlet 29 are coaxially arranged along a pump flow axis X at diametrically opposite lateral sides of the pump assembly 3.

The first valve 15 comprises a pipe section 39 of the outlet pipe 5, wherein the pipe section 39 extends along the primary outlet flow direction 19. The primary outlet flow direction 19 extends transverse, preferably orthogonal to the pump flow axis X. The first valve 15 further comprises a valve opening 41 in the pipe section 39, a valve seat 43 and a valve body 45 (see FIG. 4). The valve opening 41, the valve seat 43 and the valve body 45 define a common valve axis 47 to which they are coaxially aligned. The valve axis 47 is preferably identical to the pump flow axis X as shown in all embodiments of FIGS. 2 to 8. The first valve 15 further comprises an operating element 49 in form of an adjustment wheel manually rotatable about the valve axis 47. The operating element 49 is arranged at the pipe section 39 dia-metrically opposite from the valve opening 41 being connected to the pump outlet 29 of the pump assembly 3.

Figure 4:
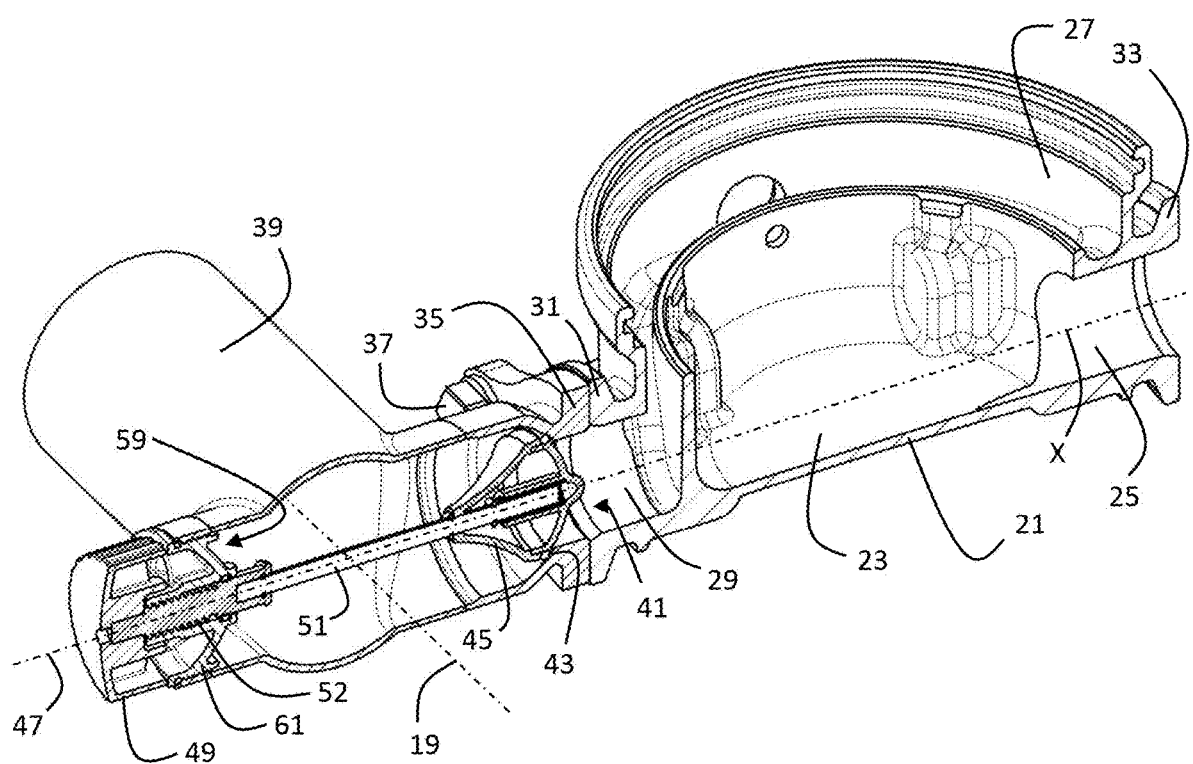
FIG. 4 is a perspective sectional half view on the parts shown in FIG. 3.

FIG. 4 gives a view on the inner parts of the first valve 15. The operating element 49 is operatively connected to the valve body 45 by a valve control shaft 51 extending along the valve axis 47. The axial position of the valve control shaft 51 along the valve axis 47 is adjust-able by rotating the operating element 49 about the valve axis 47 by means of a thread connection 52. FIG. 4 shows the valve 15 in a shut-off valve mode, in which the valve body 45 is fixed against the valve seat 43 to close the valve opening 41 for any fluid flow direction. The valve control shaft 51 comprises a first stop surface 53 facing along the valve axis 47 towards the valve opening 41 and a second stop surface 55 facing along the valve axis 47 towards the operating element 49. The first stop surface 53 and the second stop surface 55 have an axial distance S to each other. The axial distance S deter-mines the maximal range of movability of the valve body 45 relative to the valve control shaft 51. In the shut-off valve mode shown in FIG. 4, the first stop surface 53 pushes the valve body 45 against the valve seat 43 to close the valve opening 51. The valve control shaft 51 has, in the shut-off valve mode as shown in FIG. 4, an axial position closest to the valve opening 41, i.e. the operating element 49 is fully screwed inward towards the valve opening 41. The range of movability is then zero, because the valve body 45 cannot move relative to the valve control shaft 51 towards the second stop surface 55.

Figure 5:
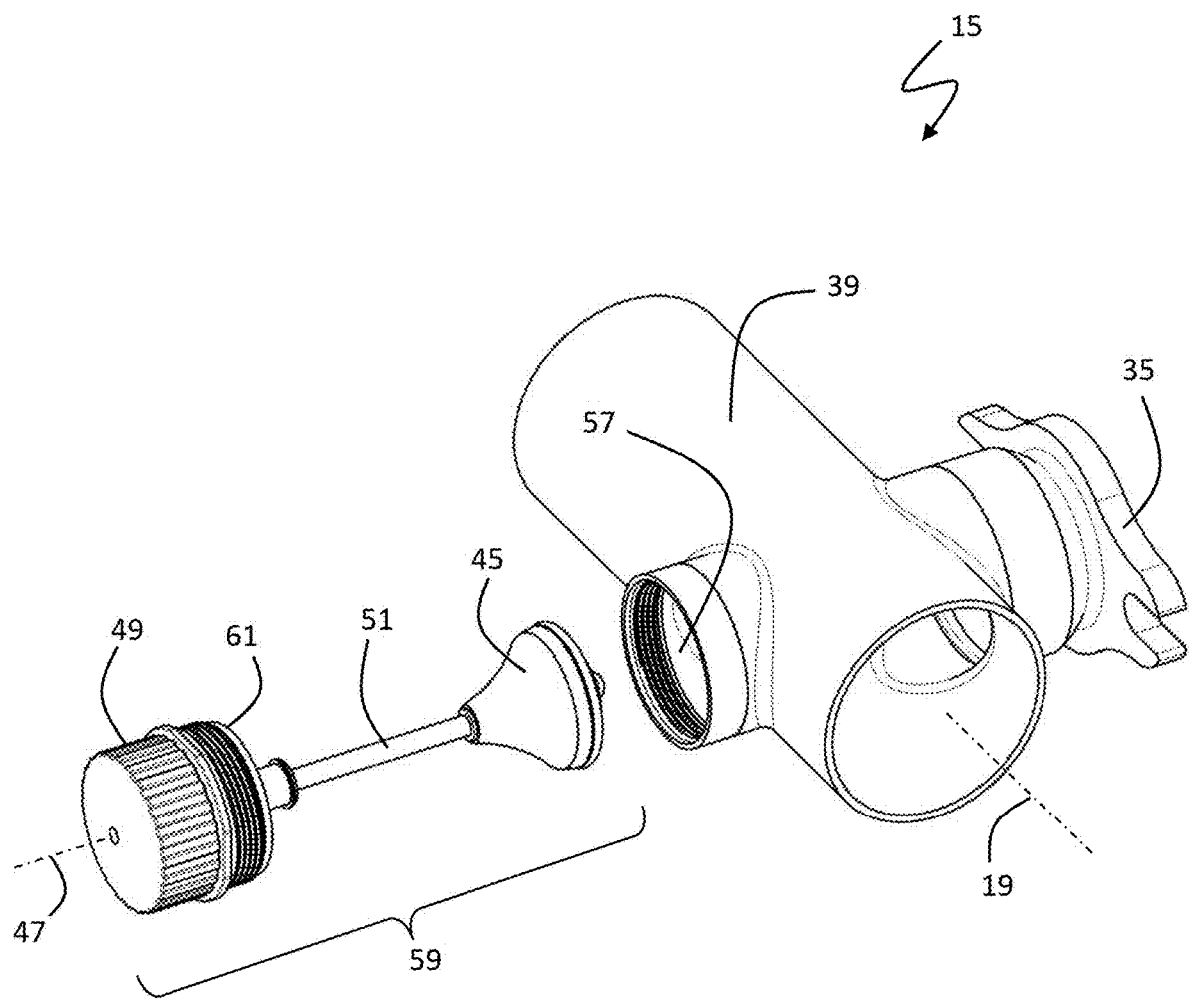
FIG. 5 is a perspective view of a first valve according to the present disclosure before the operating element, the valve control shaft and the valve body are mounted in the operating position.

FIG. 5 shows the first valve 15 before the inner parts of the first valve 15 are assembled. In order to easily assemble the first valve 15, the pipe section 39 comprises an insertion opening 57 diametrically opposite from the valve opening 41 and coaxial to the valve axis 47. The insertion opening 57 has a larger diameter than the valve body 45. The operating element 49, the valve shaft 51 and the valve body 45 can therefore be preassembled and then inserted through the insertion opening 57 along the valve axis 47 as a preassembled unit 59. The preassembled unit 59 further comprises a plug 61 with an outer thread connection for being screwed into the insertion opening 57. The parts of the preassembled unit 59 may be made of a plastic mate-rial. However, it is preferred that at least the valve control shaft 51 is made of metal in order to insure sufficient stability. The valve control shaft 51 should be as thin as possible in order to minimize the induced flow resistance along the primary flow direction 19 and as thick as necessary to insure sufficient stability.

Figure 6:
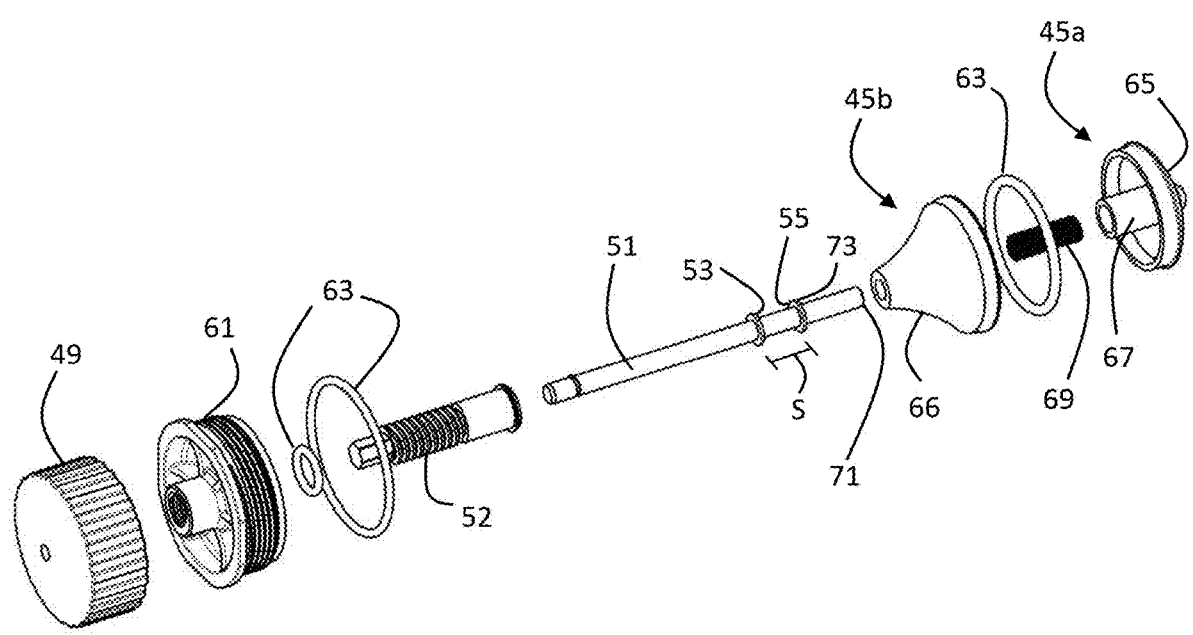
FIG. 6 is an exploded view of the operating element, the valve control shaft and the valve body according to the present disclosure.

FIG. 6 shows the individual parts of the preassembled unit 59 separately in an exploded view. The unit 59 may comprise O-rings 63 for sealing purposes. The valve body 45 is here composed of a first valve body portion 45a and a second valve body portion 45b. The first valve body portion 45a comprises a convex first surface portion 65 having a normal vector with a component facing the valve opening 41 and the second valve body portion 45b has a second surface portion 66 with a normal vector with a component facing away from the valve opening 41. When assembled together, the first valve body portion 45a and the second valve body portion 45b form the valve body 45 having a drop-like shape. The first valve body portion 45a further comprises an inner sleeve 67 for receiving a spring 69 into which a first end 71 of the valve control shaft 51 extends. The spring 69 is pushed against a first spring stop surface 73 of the valve control shaft 51, wherein the first spring stop surface 73 faces towards the valve opening 41. The first valve body portion 45a further comprises an inner second spring stop surface 75 facing away from the valve opening 41 towards the first spring stop surface 73. Depending on the axial position of the valve body 45 relative to the valve control shaft 51, the distance between the first spring stop surface 73 and the second spring stop surface 75 determines how much the spring is pressed together or released.

Figure 7A:
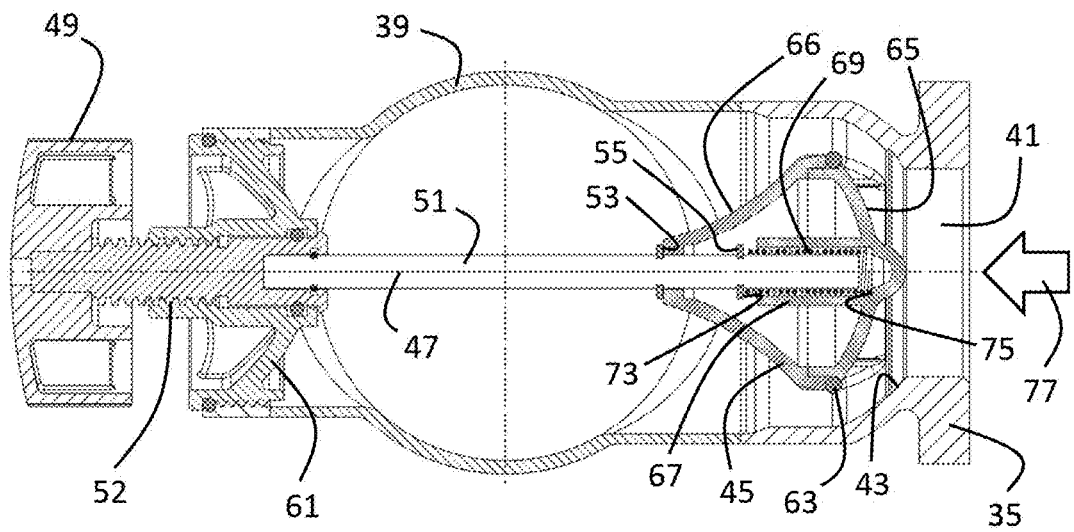
FIG. 7a is a cross-sectional view of a first valve according to the present disclosure in one of different configurations.
Figure 7B:
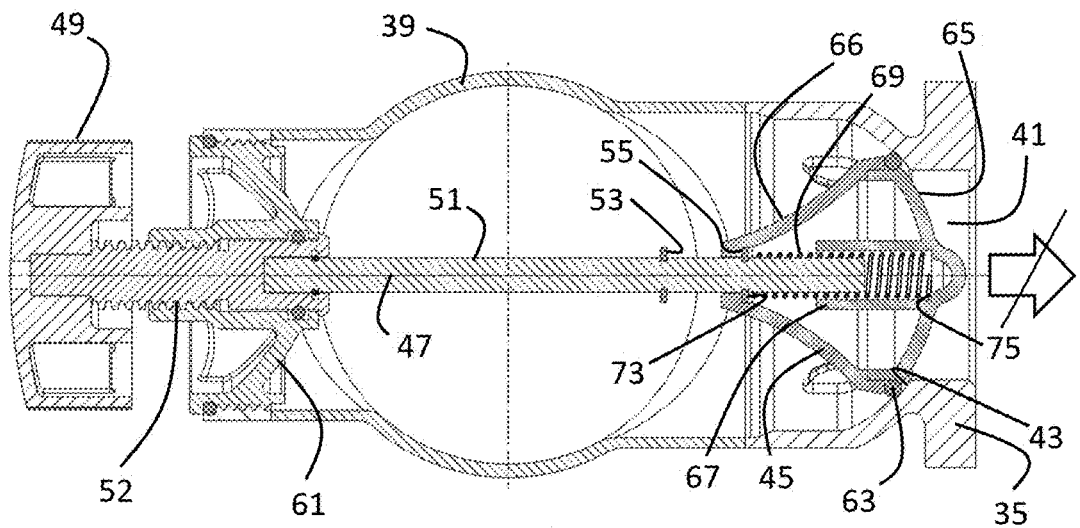
FIG. 7b is a cross-sectional view of a first valve according to the present disclosure in another of different configurations.
Figure 7C:
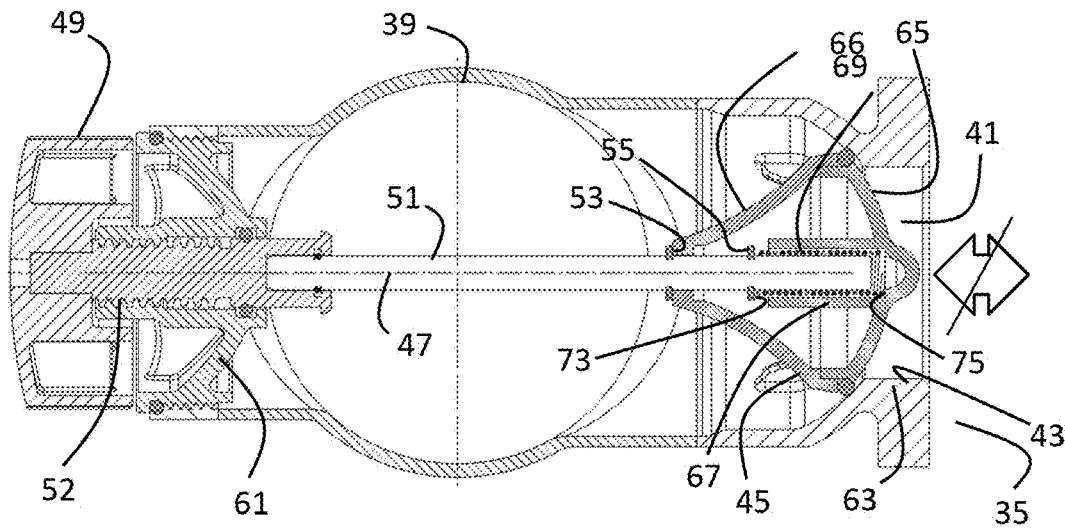
FIG. 7c is a cross-sectional view of a first valve according to the present disclosure in another of different configurations.

This is much better visible in FIGS. 7a-c. FIGS. 7a and 7b show a cross section of the first valve 15 along the valve axis 47, wherein the first valve 15 is operating in a check valve mode. For selecting the check valve mode, the operating element 49 is fully screwed outward to position the valve control shaft 51 axially furthest away from the valve opening 41. In the check valve mode as shown in FIGS. 7a and 7b, the valve body 45 is axially movable relative to the valve control shaft 51 within a range defined by the stop surfaces 53, 55. In FIG. 7a an inward fluid flow 77 from the valve opening 41 towards the valve body 45 is present. This is the normal situation when the connected pump assembly 3 is operating and pumping fluid into the outlet pipe 5. The fluid flow 77 pushes the valve body 45 towards an open position against the stop surface 53. It should be noted that the spring 69 is compressed in the open position of the valve body 45. This means that the opening of the valve body 45 upon the fluid flow 77 from the valve opening 41 towards the valve body 45 loads the spring 69. Without a sufficient flow 77 from the valve opening 41 to-wards the valve body 45, the spring 69 pushes the valve body 45 to-wards the valve seat 43 into a closing position as shown in FIG. 7b.

FIG. 7b shows the situation when the pressure in the outlet pipe 5 is higher than the pressure at the pump outlet 29 of the connected pump assembly 3. This is typically the case when the connected pump assembly 3 is idle and not pumping fluid while the other parallel pump assemblies are operating and pumping. The pressure difference in addition to the spring force of the spring 69 pushes the valve body 45 into a sealing contact with the valve seat 43. Thereby, an undesirable backflow through an idle pump assembly 3 is prevented.

FIG. 7c shows the first valve 15 in a shut-off valve mode, in which the operating element 49 is fully screwed inward so that the valve control shaft 51 is in a position closest to the valve opening 41. In the shown shut-off valve mode, the valve body 45 is not movable anymore in axial direction relative to the valve control shaft 51, because the stop surface 53 is pushed against the valve body 45 to fix it against the valve seat 43 to close the valve opening 41 for any fluid flow direction. If the operating element 49 is in an intermediate position between fully opened (FIGS. 7a, b) and fully closed (FIG. 7c), the initial spring load in the check-valve mode as shown in FIG. 7b is adjustable. As the initial spring load for pressing the valve body 45 against the valve seat 43 is to be overcome by the pressure differential for opening the first valve 15 as shown in FIG. 7a, the minimum pressure differential for opening the first valve 15 in the check-valve mode is adjust-able by an intermediate position of the operating element 49. However, if the minimum pressure differential is increased by operating the first valve 15 in the check-valve mode at an intermediate position of the operating element 49, this may come at the cost of a reduced opening degree of the first valve 15.

Figure 8A:
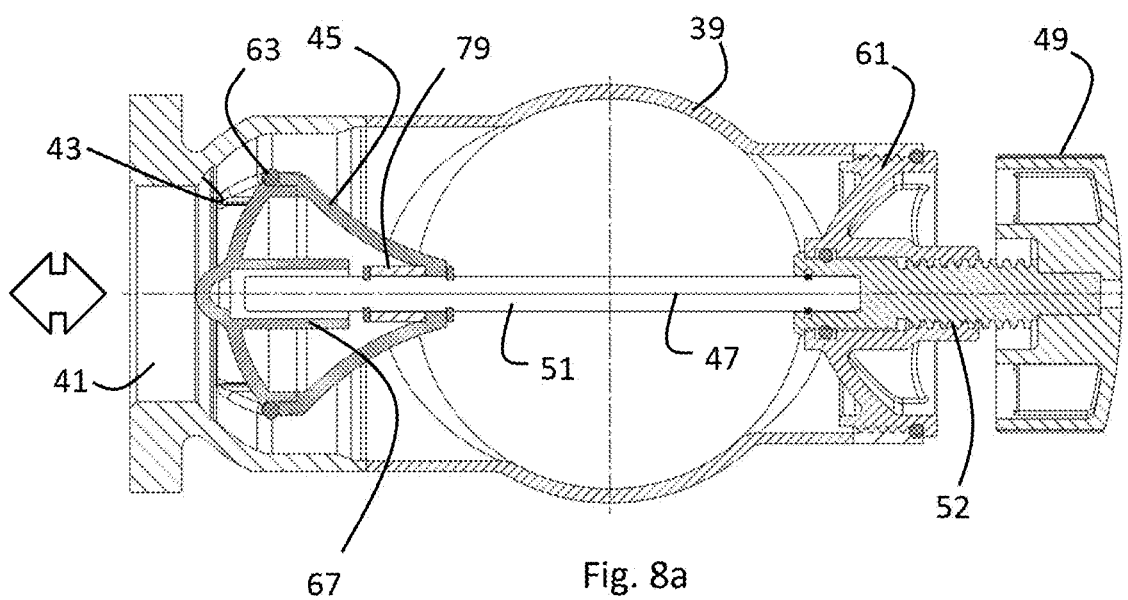
FIG. 8a is a cross-sectional view of a second valve according to the present disclosure in one of different configurations.
Figure 8B:
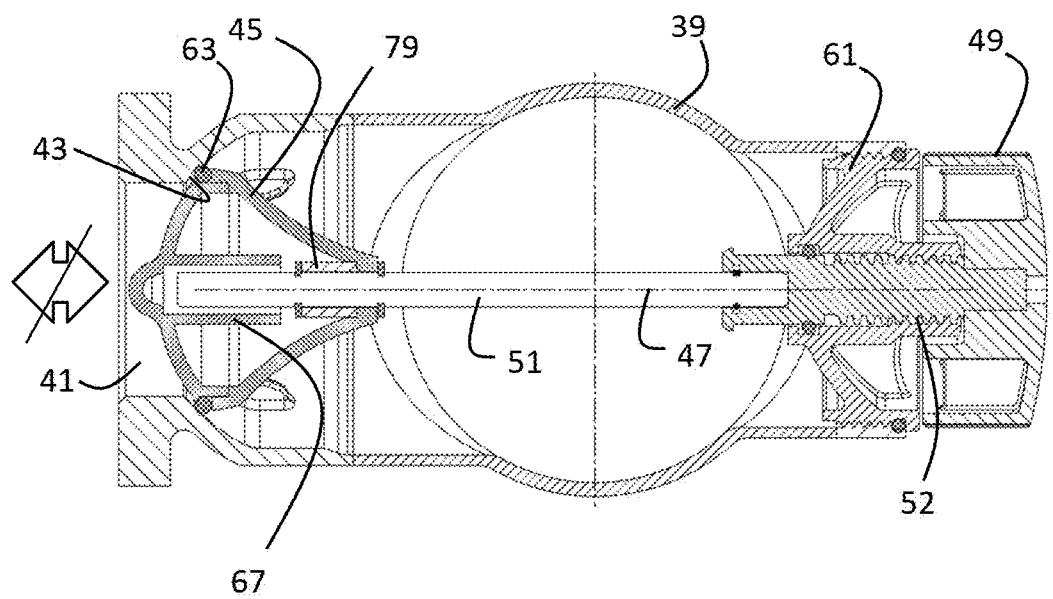
FIG. 8b is a cross-sectional view of a second valve according to the present disclosure in one of different configurations.

FIGS. 8a and 8b show a second valve 17 as part of the second valve system 14 to be installed at the inlet side of a pump assembly 3. The second valves 17 of the second valve system 14 are almost identical to the first valves 15 of the first valve system 13 with the difference that the second valve 17 does not have a check valve mode. The second valve 17 is selectively operable in an always open-mode as shown in FIG. 8a and a shut-off mode as shown in FIG. 8b. Therefore, there is no need for the spring 69 in the second valve 17. The valve body 45 is always fixed relative to the valve control shaft 51 and is not movable between the stop surfaces 53, 55. This is achieved by an additional blocking body 79 between the valve body and the stop surface 55 in form of a sleeve. For a normal operation of the pump, the operating element 49 is fully screwed outward as shown in FIG. 8a to operate the valve in an always open valve mode. When the pump assembly must be disconnected from the inlet pipe 9, e.g. for maintenance, repair or exchange, the operating element 49 may be screwed inward to push the valve body 45 into a closing position against the valve seat 43 as shown in FIG. 8b. The second valve 17 is then in a shut-off valve mode.

The use of the first valve system 13 described herein for an out-let side pipe manifold 11 and, preferably in addition, of the second valve system 14 for an inlet side pipe manifold 13 as part of a booster pump system 1 has the advantage that less installation space is need-ed and less pipe resistance is introduced compared to the systems known in the prior art. Furthermore, the valve systems are more cost efficient in production and assembly.

Where, in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional, preferable, advantageous, convenient or the like are optional and do not limit the scope of the independent claims.

The above embodiments are to be understood as illustrative examples of the disclosure. It is to be understood that any feature de-scribed in relation to any one embodiment may be used alone, or in combination with other features described, and may also be used in combination with one or more features of any other of the embodiments, or any combination of any other of the embodiments. While at least one exemplary embodiment has been shown and described, it should be understood that other modifications, substitutions and alter-natives are apparent to one of ordinary skill in the art and may be changed without departing from the scope of the subject matter de-scribed herein, and this application is intended to cover any adaptations or variations of the specific embodiments discussed herein.

In addition, "comprising" does not exclude other elements or steps, and "a" or "one" does not exclude a plural number. Further-more, characteristics or steps which have been described with reference to one of the above exemplary embodiments may also be used in combination with other characteristics or steps of other exemplary embodiments described above. Method steps may be applied in any order or in parallel or may constitute a part or a more detailed version of another method step. It should be understood that there should be embodied within the scope of the patent warranted hereon all such modifications as reasonably and properly come within the scope of the contribution to the art. Such modifications, substitutions and alter-natives can be made without departing from the spirit and scope of the disclosure, which should be determined from the appended claims and their legal equivalents.

While specific embodiments of the invention have been shown and described in detail to illustrate the application of the principles of the invention, it will be understood that the invention may be embodied otherwise without departing from such principles.

LIST OF REFERENCE CHARACTERS 101 booster pump system (prior art)
103 pump assembly (prior art)
105 outlet pipe (prior art)
107 inlet pipe (prior art)
109 shut-off valve (prior art)
111 check valve (prior art)
D distance (prior art)
1 pump system
3 pump assembly
5 outlet pipe
7 outlet side pipe manifold
9 inlet pipe
11 inlet side pipe manifold
13 first valve system
14 second valve system
15 first valve
17 second valve
19 primary flow direction
21 bottom part of a pump housing
23 low-pressure region
25 pump inlet
27 high-pressure region
29 pump outlet
31 flange connection
33 flange connection
35 pump connection
37 bolt
39 pipe section
41 valve opening
43 valve seat
45 valve body
45a first valve body portion
45b second valve body portion
47 valve axis
49 operating element
51 valve control shaft
52 thread connection
53 first stop surface
55 second stop surface
57 insertion opening
59 preassembled unit
61 plug
63 O-ring
65 first surface portion
66 second surface portion
67 inner sleeve
69 spring
71 first end of valve control shaft
73 first spring stop surface
75 second spring stop surface
77 fluid flow
79 blocking body
d distance
X pump flow axis
R rotor axis
S axial distance between stop surfaces

What is claimed is:

1. A valve system fluidly connectable to a pump system comprising at least one pump assembly fluidly connectable to a pipe, the valve system comprising a valve, the valve comprising:
   a pipe section of the pipe, wherein the pipe section defines a primary flow direction;
   a valve opening in the pipe section;
   a valve seat;
   a valve body, wherein the valve opening, the valve seat and the valve body define a common valve axis extending transversely to the primary flow direction;
   an operating element arranged at the pipe section diametrically opposite from the valve opening, wherein:
      the operating element is configured to control the valve body for selectively operating in a check-valve mode, in which the valve body is movable along the valve axis to open the valve opening upon a fluid flow from the valve opening towards the valve body;
      the operating element is configured to control the valve body for selectively operating in a shut off-valve mode, in which the valve body is fixed against the valve seat to close the valve opening for any fluid flow direction;
      the at least one valve further comprises a pump connection configured to connect to the at least one pump assembly; and
      the valve seat is an integral part of the pump connection.

2. The valve system according to claim 1, wherein the valve further comprises a valve control shaft extending along the valve axis and operatively connecting the operating element and the valve body.

3. The valve system according to claim 2, wherein the operating element is configured to determine a position of the valve control shaft along the valve axis.

4. The valve system according to claim 2, wherein:
   the valve body is movably coupled to the valve control shaft to move along the valve axis in a range between an opening position and a closing position in the check-valve mode; and
   the position of the valve control shaft along the valve axis determines the range.

5. The valve system according to claim 4, wherein the range is zero in an end position of the valve control shaft so that the valve body is fixed in the closing position in the shut off-valve mode.

6. The valve system according to claim 1, wherein the operating element comprises an adjustment wheel manually rotatable about the valve axis to determine a range between an opening position and a closing position of the valve body.

7. The valve system according to claim 1, wherein the valve body has a drop-like shape with a first surface portion having a normal vector with a component facing the valve opening and a second surface portion having a normal vector with a component facing away from the valve opening.

8. The valve system according to claim 7, wherein the first surface portion is convex and the second surface portion is concave.

9. The valve system according to claim 7, wherein the second surface portion is longer in direction of the valve axis than the first surface portion.

10. The valve system according to claim 1, wherein the pipe section comprises an insertion opening diametrically opposite from the valve opening, wherein the insertion opening has a larger diameter than the valve body.

11. A piping manifold comprising:
a pipe; and
a valve system comprising at least two valves, wherein a pipe section of each valve forms an integral part of the pipe, each of the at least two valves comprising:
the pipe section of the pipe, wherein the pipe section defines a primary flow direction;
a valve opening in the pipe section;
a valve seat;
a valve body, wherein the valve opening, the valve seat and the valve body define a common valve axis extending transversely to the primary flow direction;
an operating element arranged at the pipe section diametrically opposite from the valve opening, wherein:
the operating element is configured to control the valve body for selectively operating in a check-valve mode, in which the valve body is movable along the valve axis to open the valve opening upon a fluid flow from the valve opening towards the valve body; and
the operating element is configured to control the valve body for selectively operating in a shut off-valve mode, in which the valve body is fixed against the valve seat to close the valve opening for any fluid flow direction.

12. The piping manifold according to claim 11, wherein the pipe extends essentially straight along the primary flow direction and the valve axes of the at least two valves are arranged in parallel to each other.

13. The piping manifold according to claim 12, wherein the at least two valves are evenly distributed along the pipe with a same distance to each other in the primary flow direction.

14. A pump system comprising:
at least two pump assemblies;
a common outlet pipe, wherein the at least two pump assemblies are fluidly connected in parallel to each other to the common outlet pipe; and
a valve system comprising at least one valve for each pump assembly, wherein a pipe section of each at least one valve for each pump assembly forms a part of the common outlet pipe, wherein each at least one valve for each pump assembly comprises:
the pipe section of the common outlet pipe, wherein the pipe section defines a primary flow direction;
a valve opening in the pipe section;
a valve seat;
a valve body, wherein the valve opening, the valve seat and the valve body define a common valve axis extending transversely to the primary flow direction;
an operating element arranged at the pipe section diametrically opposite from the valve opening, wherein:
the operating element is configured to control the valve body for selectively operating in a check-valve mode, in which the valve body is movable along the valve axis to open the valve opening upon a fluid flow from the valve opening towards the valve body; and
the operating element is configured to control the valve body for selectively operating in a shut off-valve mode, in which the valve body is fixed against the valve seat to close the valve opening for any fluid flow direction.

15. The pump system according to claim 14, further comprising:
a common inlet pipe;
another valve system, wherein:
the pump assemblies are fluidly connected in parallel to each other to the common inlet pipe;
the other valve system comprises at least one further valve for each pump assembly;
the at least one further valve comprises a pipe section, wherein the pipe section of each second valve defines a primary flow direction and forms a part of the common inlet pipe.

16. The pump system according to claim 15, wherein the at least one further valve further comprises:
a valve opening in the pipe section;
a valve seat;
a valve body, wherein the valve opening, the valve seat and the valve body define a common valve axis extending transversely to the primary flow direction;
an operating element arranged at the pipe section of the at least one further valve, diametrically opposite from the valve opening, wherein:
the operating element of the at least one further valve is configured to control the valve body of the at least one further valve for selectively operating in an always open-valve mode, in which the valve body of the at least one further valve is fixed in an opening position to open the valve opening for any fluid flow direction; and
the operating element of the at least one further valve is configured to control the valve body of the at least one further valve for selectively operating in a shut off-valve mode, in which the valve body of the at least one further valve is fixed against the valve seat of the at least one further valve to close the valve opening of the at least one further valve for any fluid flow direction.

* * * * *